(12) United States Patent
Ganesan

(10) Patent No.: US 11,195,631 B2
(45) Date of Patent: Dec. 7, 2021

(54) FLOATING NUCLEAR REACTOR PROTECTION SYSTEM

(71) Applicant: Palvannanathan Ganesan, Omaha, NE (US)

(72) Inventor: Palvannanathan Ganesan, Omaha, NE (US)

(*) Notice: Subject to any disclaimer, the term of this patent is extended or adjusted under 35 U.S.C. 154(b) by 202 days.

(21) Appl. No.: 16/387,783

(22) Filed: Apr. 18, 2019

(65) Prior Publication Data

US 2019/0244719 A1 Aug. 8, 2019

Related U.S. Application Data

(63) Continuation-in-part of application No. 15/807,182, filed on Nov. 8, 2017, now Pat. No. 10,714,221.

(51) Int. Cl.
| | | |
|---|---|---|
| *G21C 13/024* | (2006.01) | |
| *G21C 11/04* | (2006.01) | |
| *G21C 9/04* | (2006.01) | |
| *G21C 13/10* | (2006.01) | |
| *G21C 13/093* | (2006.01) | |
| *G21D 1/02* | (2006.01) | |
| *B63B 35/44* | (2006.01) | |

(52) U.S. Cl.
CPC ............. *G21C 11/04* (2013.01); *G21C 9/04* (2013.01); *G21C 13/024* (2013.01); *G21C 13/093* (2013.01); *G21C 13/10* (2013.01); *B63B 2035/4446* (2013.01); *G21D 1/02* (2013.01)

(58) Field of Classification Search
CPC ...... G21C 11/04; G21C 13/093; G21C 19/07; G21F 1/01; G21F 1/042; G21F 1/12; G21F 5/12; B65D 88/76; B65D 90/022; B63B 2035/4446

USPC ........................................... 220/567.1
See application file for complete search history.

(56) References Cited

U.S. PATENT DOCUMENTS

| | | | | |
|---|---|---|---|---|
| 3,516,568 A | * | 6/1970 | Fish ................... | B65D 88/76 |
| | | | | 405/55 |
| 4,451,173 A | * | 5/1984 | Watson ............... | G21C 19/07 |
| | | | | 405/53 |
| 5,543,188 A | * | 8/1996 | Te'eni ................ | B32B 27/12 |
| | | | | 156/89.11 |
| 8,867,691 B1 | * | 10/2014 | Root .................. | B63B 27/143 |
| | | | | 376/277 |
| 9,378,855 B2 | | 6/2016 | Ganesan | |
| 9,396,823 B2 | | 7/2016 | Ganesan | |
| 9,502,143 B2 | | 11/2016 | Ganesan | |

* cited by examiner

*Primary Examiner* — Sharon M Davis
(74) *Attorney, Agent, or Firm* — Dennis L. Thomte; Thomte Patent Law Office LLC

(57) ABSTRACT

A nuclear reactor is positioned on a barge which floats on the water of a water tank. The water tank includes a bottom wall, first and second end walls and first and second side walls. The bottom wall includes a lower layer of concrete, an intermediate layer of water impervious material positioned on the lower layer of concrete, and an upper layer of concrete positioned on the intermediate layer of water impervious material. Each of the first and second end walls and the first and second side walls includes an outer layer of concrete, an intermediate layer of water impervious material positioned at the inner side of the outer layer of concrete, and an inner layer of concrete material positioned at the inner side of the intermediate layer of water impervious material.

13 Claims, 8 Drawing Sheets

FLOATING NUCLEAR REACTOR PROTECTION SYSTEM

CROSS REFERENCE TO RELATED APPLICATION

This is a Continuation-In-Part Application of application Ser. No. 15/807,182 filed Nov. 8, 2017, entitled FLOATING NUCLEAR REACTOR PROTECTION SYSTEM.

BACKGROUND OF THE INVENTION

Field of the Invention

This invention relates to a floating nuclear power reactor. More particularly this invention relates to a floating nuclear power reactor including a barge which is floatably positioned in the interior of a large water-filled tank and wherein the nuclear power reactor is positioned on the barge. Even more particularly, the invention relates to the construction of the bottom wall or floor of the tank which prevents the bottom wall from cracking or fracturing during an earthquake thereby preventing possibly contaminated water in the tank from escaping from the tank. Still more particularly, the invention relates to the construction of the walls of the tank which prevents the walls of the tank from the leaking of water, which may be radioactive, from the tank.

Description of the Related Art

Applicant has received U.S. Pat. Nos. 9,378,855; 9,396,823; and 9,502,143 relating to nuclear reactors positioned in a body of water to be able to flood and cool the nuclear reactor in the event of overheating or over pressurization of the nuclear reactor. In Applicant's prior patents and in Applicant's pending patent applications, the tank in which the nuclear reactor barge floats are constructed of concrete. Although it is believed that the concrete bottom walls, end walls and side walls of the tanks will withstand an earthquake, Applicant has devised a concrete tank which will undoubtedly withstand an earthquake.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A floating nuclear reactor is disclosed. The floating nuclear reactor of this invention includes a concrete tank, which may be rectangular, having a bottom wall, an upstanding first end wall, an upstanding second end wall, an upstanding first side wall and an upstanding second side wall. Each of the first end wall, the second end wall, the first side wall and the second side wall of the tank have an outer side, an inner side, a lower end and an upper end. The tank may be partially or fully buried in the ground with the tank having water therein. A barge is floatably positioned in the tank with the barge having a bottom wall, a first end wall, a first side wall, a second side wall and an open second end. A nuclear reactor is positioned on the barge. The bottom wall or floor of the tank includes a lower layer of concrete having a lower side and an upper side. A layer of a water impervious material, such as rubber or the like, is positioned on the upper side of the lower layer of concrete and has a lower side and an upper side. An upper layer of concrete is positioned on the upper side of the layer of the water impervious material. The construction of the bottom wall of the tank provides some flexibility to the bottom wall which will prevent the bottom wall of the tank from cracking or fracturing in the event of an earthquake. The lower and upper concrete layers of the bottom wall may have offset joints formed therein which are filled with a water impervious material.

Each of the end walls and the side walls of the tank include an outer layer of concrete having inner and outer sides. A layer of flexible water impervious material, such as rubber, is positioned at the inner side of the outer layer of concrete and has inner and outer sides. An inner layer of concrete material is positioned at the inner side of the layer of water impervious material. The construction of the end walls and the side walls of the tank prevents the leaking of water to the soil at the side of the end walls and side walls to prevent radioactive contamination of the soil in the case of a radioactive material leak into the tank.

It is therefore a principal object of the invention to provide a novel construction of the bottom wall of a tank in which a nuclear reactor barge floats.

It is also an object of the invention to provide a novel construction of the end walls and side walls of a tank in which a nuclear reactor barge floats.

It is also an object of the invention to provide a bottom wall of a tank in which a nuclear reactor floats and wherein the bottom wall has some flexibility.

It is a further object of the invention to provide end walls and side walls of a tank in which a nuclear reactor floats which prevents leakage therethrough.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Applicant has previously received U.S. Pat. Nos. 9,378,855; 9,396,823; and 9,502,143 relating to floating nuclear power reactors. Applicant incorporates the disclosure of the above identified patents in their entirety by reference thereto to complete this disclosure if necessary.

Figure 1:
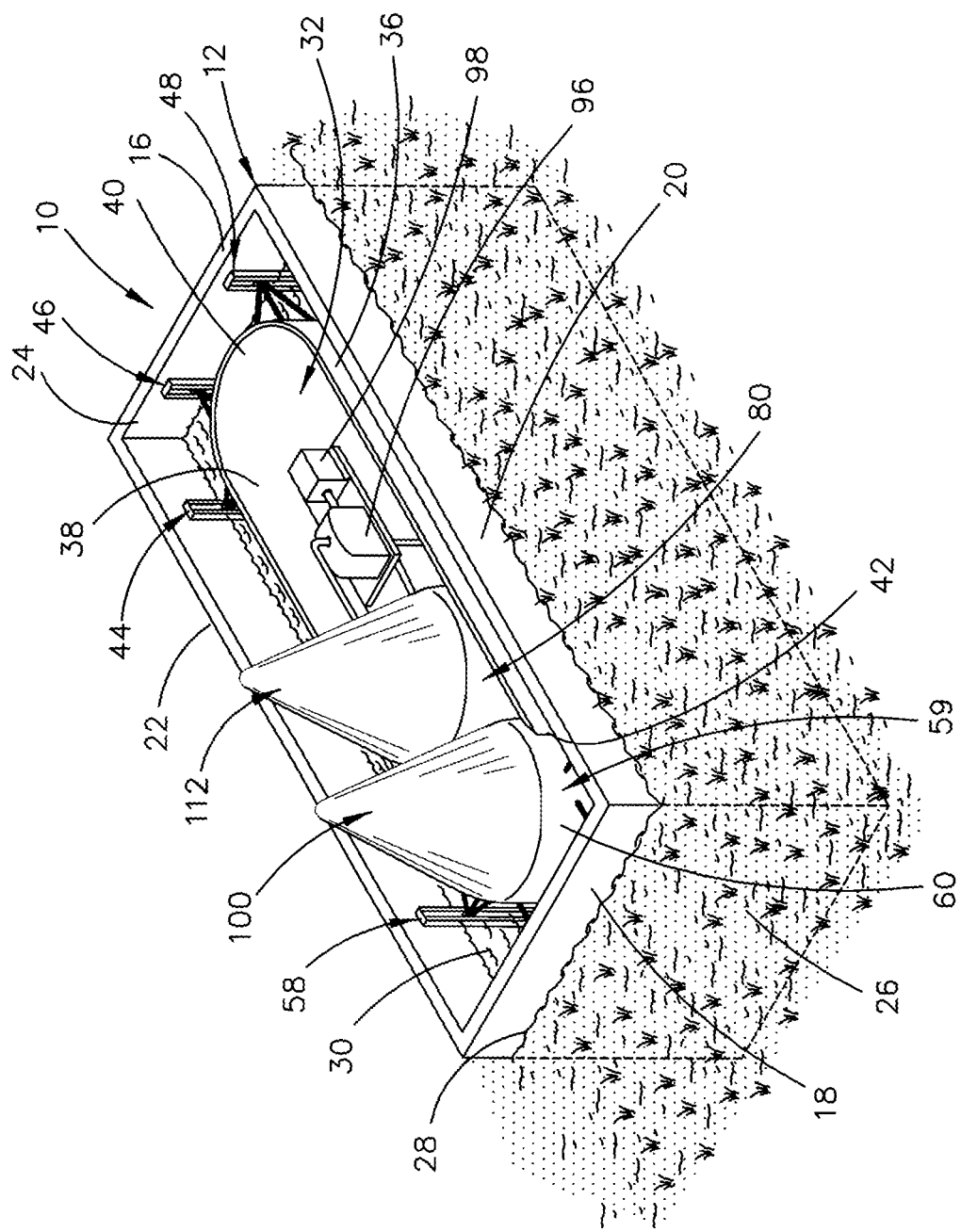
FIG. 1 is a perspective view of a floating nuclear power reactor wherein the nuclear reactor confinement member and the containment member of the heat exchanger have a conical-shaped member on the upper ends thereof.
Figure 2:
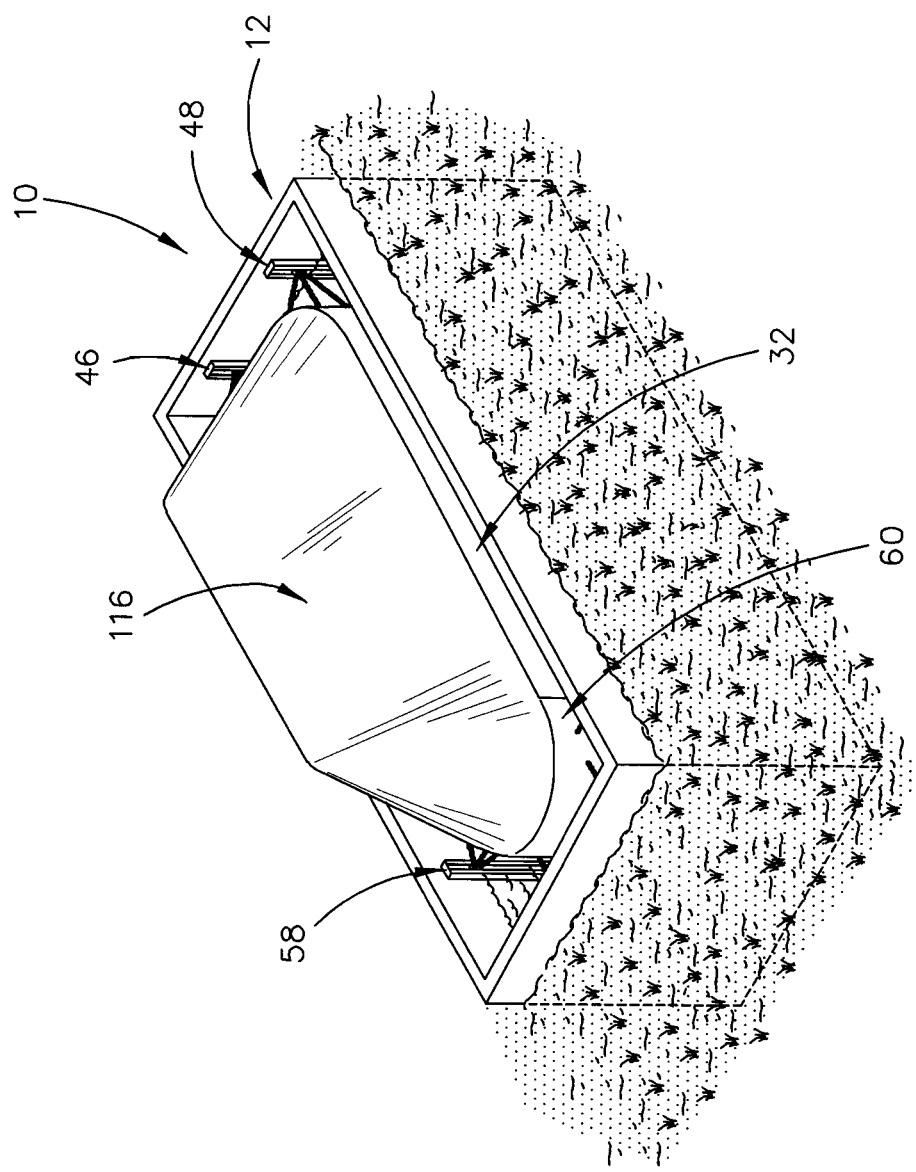
FIG. 2 is a perspective view similar to FIG. 1 except that a roof structure is positioned over the nuclear reactor, the heat exchanger and the barge.

The floating nuclear reactor of this invention is referred to generally by the reference numeral 10. The nuclear reactor 10 floats in a concrete tank 12 having a bottom wall 14, a first end wall 16, a second end wall 18, a first side wall 20, a second side wall 22 and an open upper end 24. The details of the novel tank of this invention will be described in detail hereinafter. Tank 12 is buried in the ground 26 as seen in FIG. 1 so that the open upper end 24 of tank 12 is at or above ground level 28. The tank 12 is partially filled with water 30 from a source of water. Preferably the water 30 is gravity fed to the tank 12. The tank 12 may be completely buried in the ground.

The numeral 32 refers to a barge-like vessel which floats in the tank 12. Barge 32 includes a bottom wall 34, a first side wall 36, a second side wall 38, a semi-circular end wall 40 and an open end 41 at the ends 42 and 43 of side walls 36 and 38 respectively. Barge 32 is comprised of a metal material such as stainless steel, steel, iron, aluminum or other suitable material. Barge 32 is supported in tank 12 by a plurality of upper suspension assemblies 44, 46, 48, 50, 52, 54, 56 and 58 which extend between the barge 32 and the tank 12 as will be described in detail hereinafter. Barge 32 is also supported in tank 12 by eight lower suspension assemblies, identical to suspension assemblies 44, 46, 48, 50, 52, 54, 56 and 58, which are positioned below suspension assemblies 44, 46, 48, 50, 52, 54, 56 and 58.

The numeral 59 refers to a nuclear reactor which is positioned in barge 32 so as to close the open end 41 of barge 32 as will be explained in detail hereinafter. Reactor 59 includes an upstanding containment member 60 which has a cylindrical body portion 62, a hemi-spherical upper end 64 and a hemi-spherical lower end 66. Containment member 60 is comprised of stainless steel or other suitable material. Containment member 60 is positioned at the open end 41 of barge 32 with the sides of containment member 60 being in engagement with the ends 42 and 43 of side walls 36 and 38 respectively of barge 32 and being secured thereto by welding or the like to close the open end 41 of barge 32. The positioning of the containment member 60 as just described causes the outer side of containment member 60 to be in contact with the water 30 in tank 12. Containment member 60 defines a sealed interior compartment 68.

Figure 3:
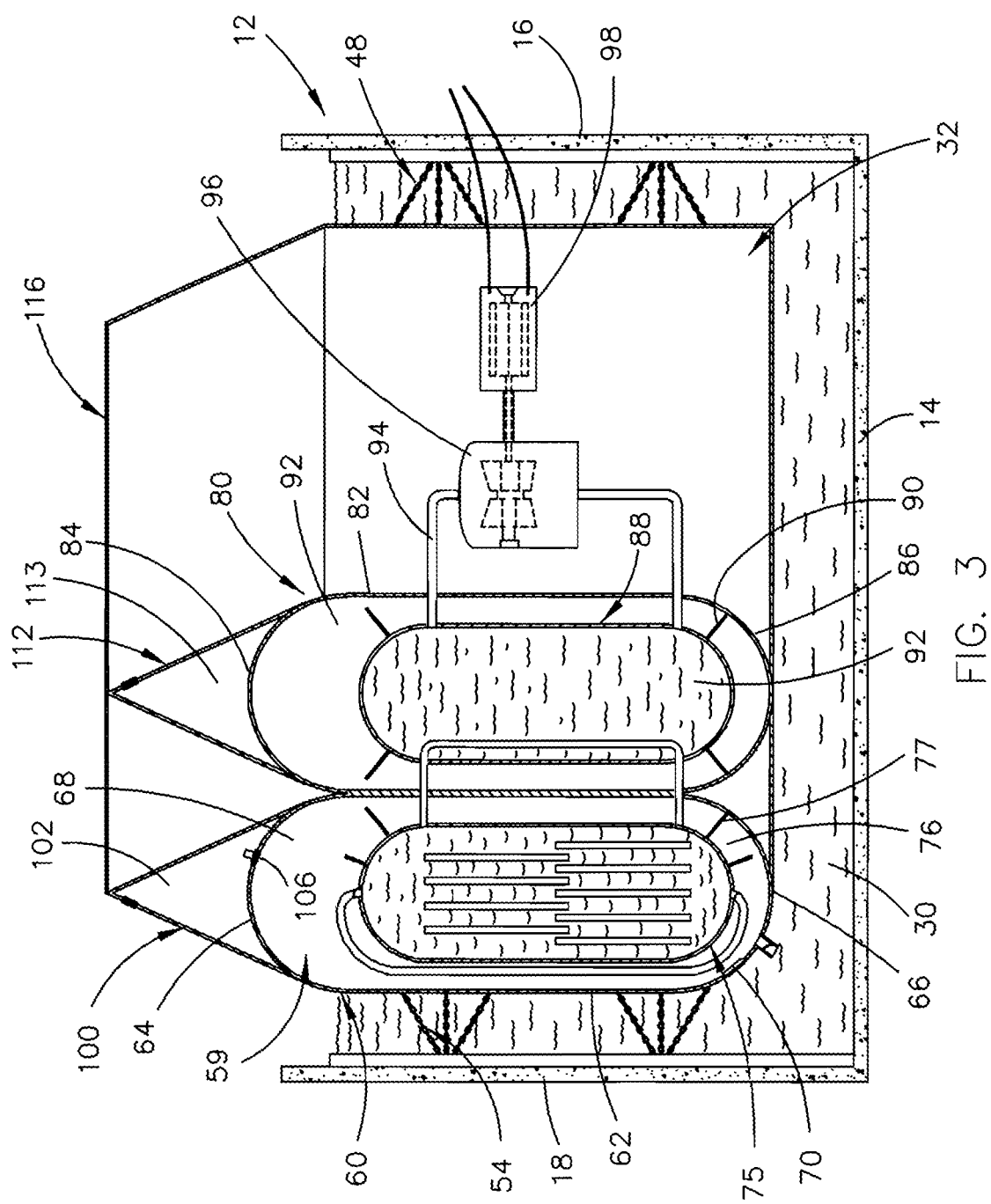
FIG. 3 is a sectional view illustrating the conical-shaped members mounted on the upper ends of the nuclear reactor and the heat exchanger thereof with a roof extending thereover.
Figure 4:
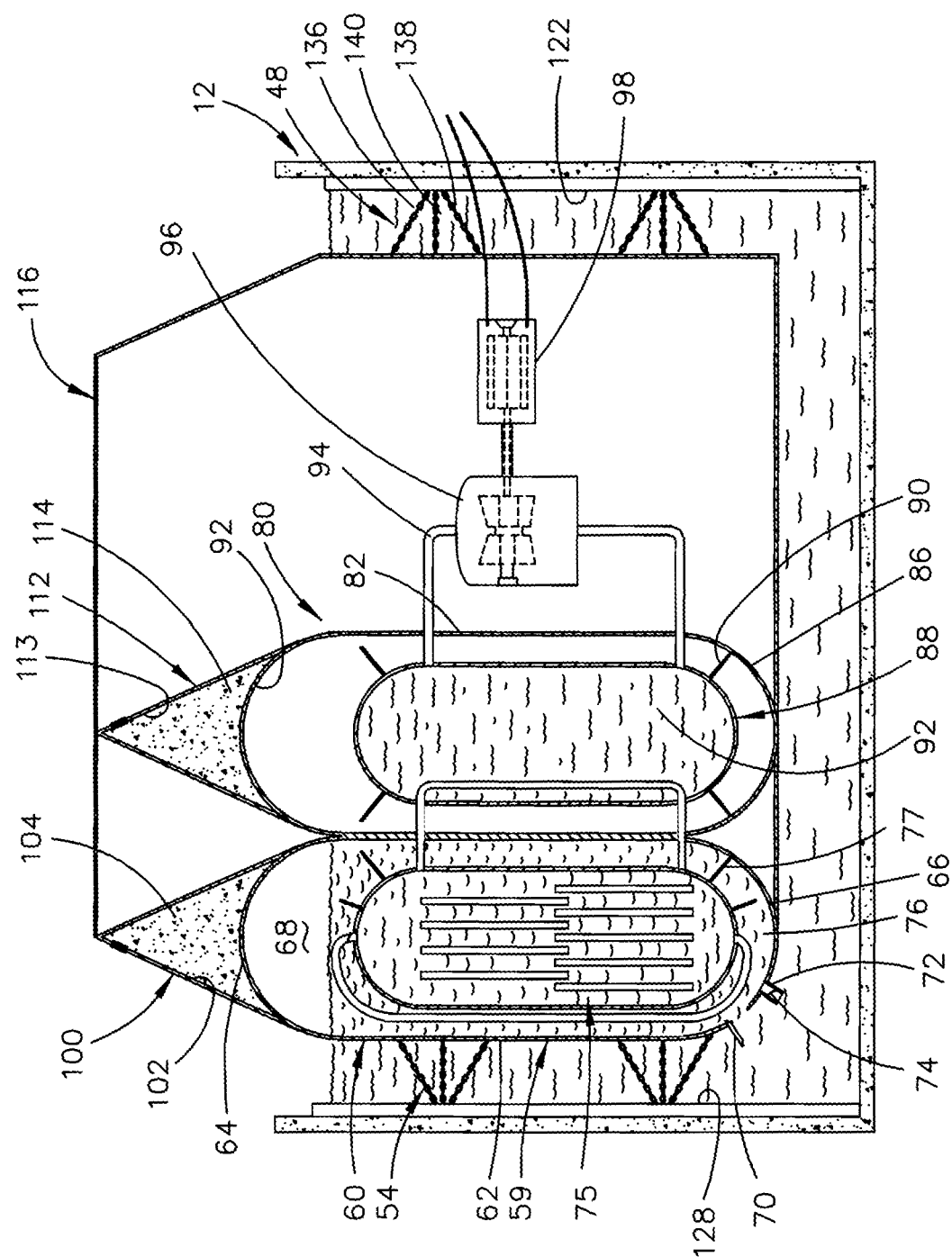
FIG. 4 is a sectional view similar to FIG. 3 except that the conical-shaped members are filled with an impact absorber material.
Figure 5:
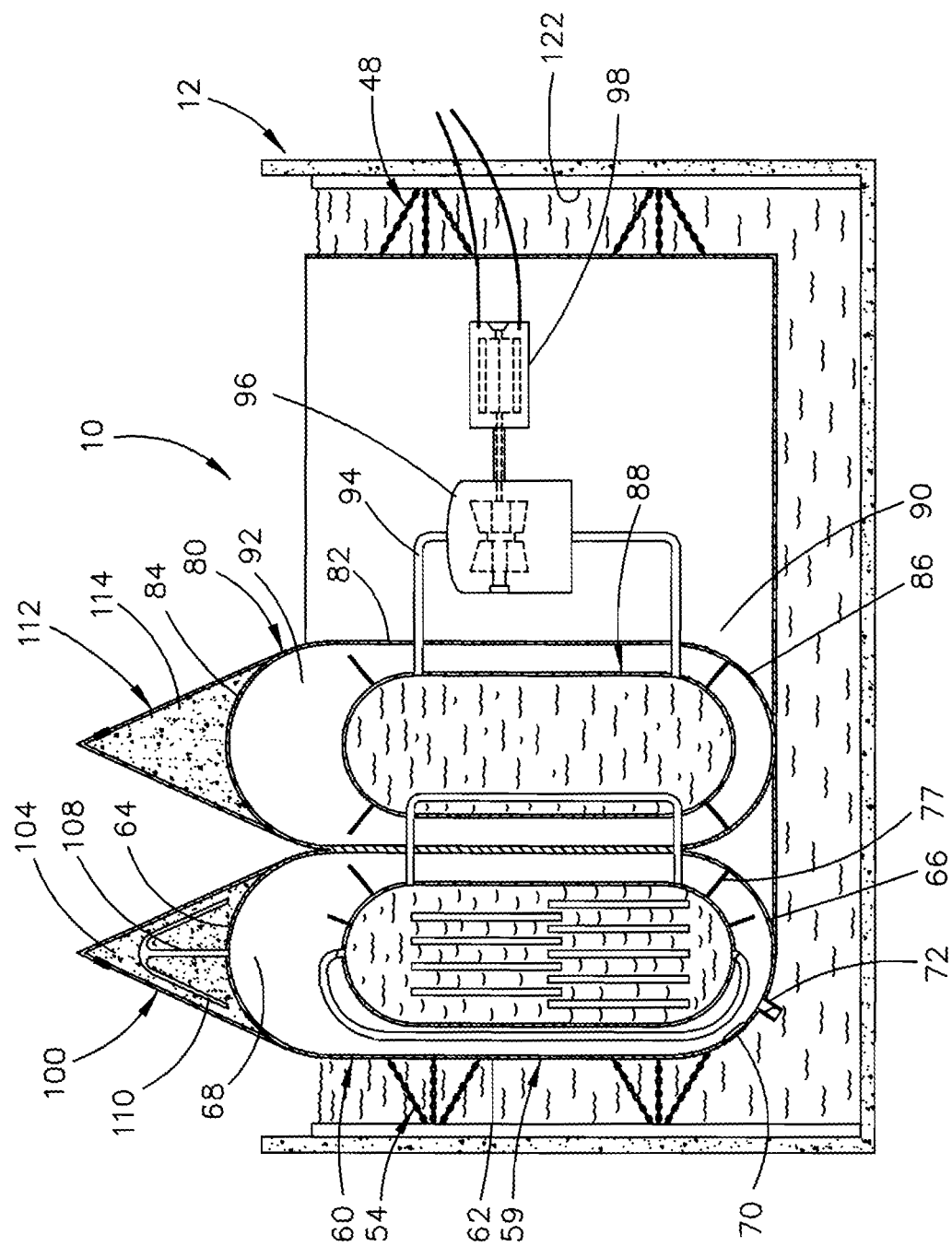
FIG. 5 is a sectional view similar to FIG. 3 except that the conical-shaped members on the nuclear reactor have a filtration material therein and a vent tube assembly therein.
Figure 6:
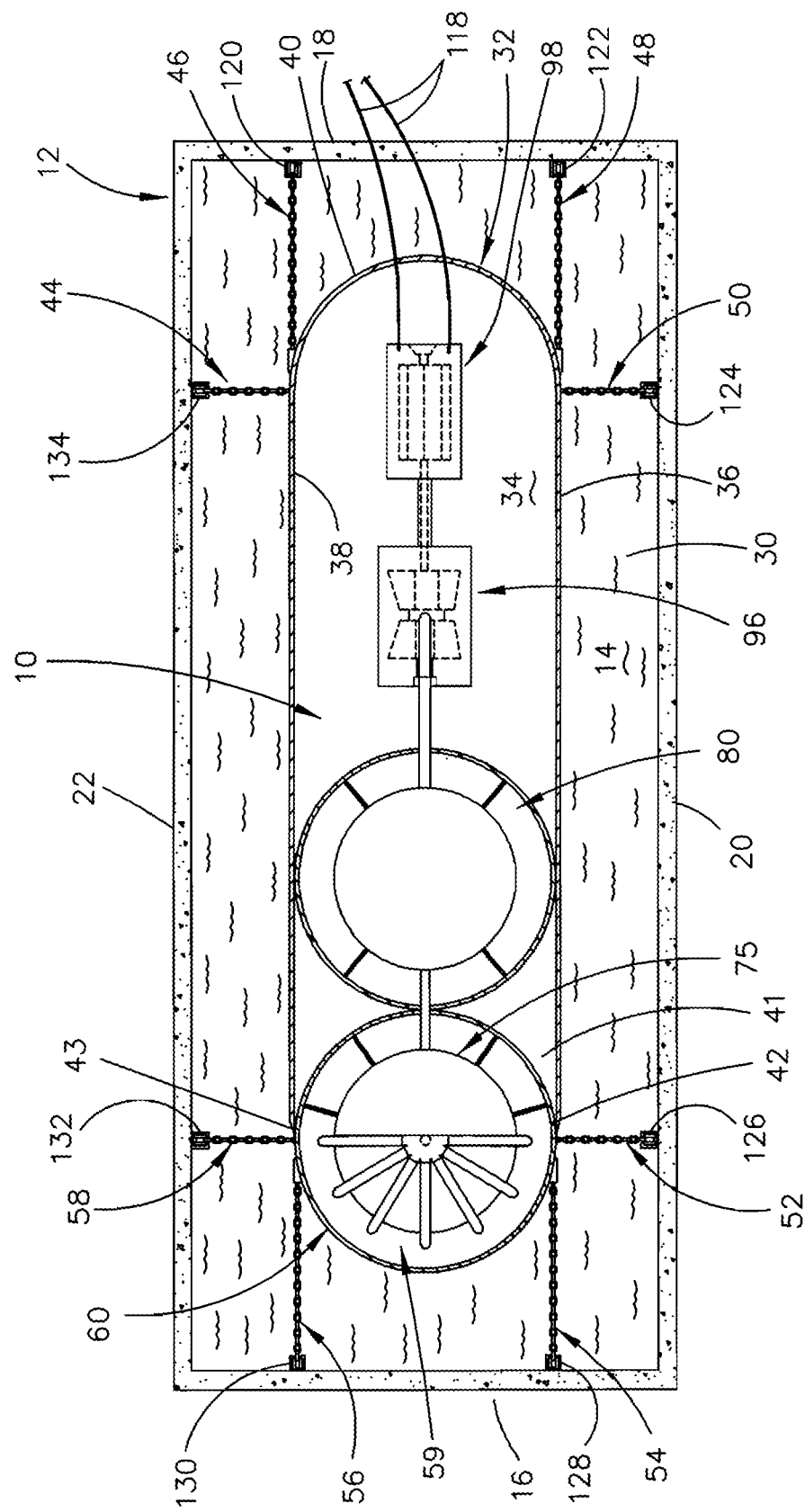
FIG. 6 is a sectional view which illustrates the suspension assemblies which suspend the barge in the water-filled tank.

Containment member 60 has a hatch 70 mounted therein as seen in FIG. 3. Containment member 60 also has a pipe 72 extending from the lower end thereof which is in fluid communication with the interior compartment 68. A normally closed one-way valve 74 is imposed in pipe 72.

A reactor vessel 75 is positioned in compartment 68 and has an interior compartment 76. Vessel 75 is supported in compartment 68 by braces 77 which extend between the exterior of reactor vessel 75 and the interior side of containment member 60 as seen in FIG. 3.

The numeral 80 refers to an upstanding heat exchanger which is positioned adjacent containment member 60 as seen in the drawings. Heat exchanger 80 includes a body section 82, an upper section 84 and a lower section 86. Heat exchanger 80 is comprised of a metal material such as stainless steel or other suitable material. A vessel 88 is positioned within heat exchanger 80 and is supported therein by braces 90 extending therebetween. Vessel 88 defines an interior compartment 92. A tube 94 interconnects the reactor vessel 75 and the vessel 88 of heat exchanger 80 as seen in the drawings. The heat exchanger 80 is connected to a turbine 96 or other device which is connected to a generator 98 or other structure.

A hollow metal cone 100 is mounted on the hemi-spherical upper end 64 of containment member 60. Cone 100 is comprised of stainless steel, steel or other suitable material. Cone 100 has an interior compartment 102 which is preferably filled with a filter material 104 which not only may serve as a filtration bed but serves as an impact absorber should the cone 100 be struck by an aircraft or a missile. The cone 100, if struck by an aircraft or missile, will disintegrate or tear apart the aircraft or missile and deflect the aircraft or missile away from the cone 100. An outlet pipe 106 may be provided in the upper end of containment member 60 to permit steam or the like to pass upwardly therethrough onto the filtration material 104.

The cone 100 may also have a discharge tube assembly 108 extending upwardly from pipe 106 and which has discharge tubes 110 extending downwardly and outwardly from the upper end of tube 108.

A metal cone 112 extends upwardly from the upper end of heat exchanger 80 and is filled with an impact absorbing material 114. Cone 112, if struck by an aircraft or missile, will disintegrate the aircraft or missile in the same manner as the cone 100.

A roof 116 extends over the cones 100, 112 and the barge 32 to hide the reactor 59 and the heat exchanger 80 from view. Thus, if an aircraft is attempting to strike the reactor 59, the pilot of the aircraft will not be able to determine the exact location of the reactor 59.

A pair of vertically disposed guide tracks or channels 120 and 122 are secured to the inner side of end wall 18. A pair of vertically disposed guide tracks or channels 124 and 126 are secured to the inner side of side wall 20. A pair of vertically disposed guide tracks or channels 128 and 130 are secured to the inner side of end wall 16. A pair of vertically disposed guide tracks or channels 132 and 134 are secured to the inner side of side wall 22. Each of the guide tracks 120, 122, 124, 126, 128, 130, 132 and 134 have an upper wheel and a lower wheel vertically movable therein. The guide tracks 134, 120, 122, 124, 126, 128, 130 and 132 form a part of the suspension assemblies 44, 46, 48, 50, 52, 54, 56 and 58 respectively.

Inasmuch as the suspension assemblies 44, 46, 48, 50, 52, 54, 56 and 58 of FIGS. 1-6 are identical except for length, only suspension assembly 48 will be described in detail. Suspension assembly 48 includes an upper chain member 136, a lower chain member 138 and an intermediate chain member 140. The outer ends of chain members 136, 138 and 140 are secured to the upper wheel in guide track 122. The inner ends of chain members 136, 138 and 140 are secured to the barge 32. As seen, upper chain member 136 extends upwardly and inwardly from guide track 122 to barge 32. As also seen, lower chain member 138 extends downwardly and inwardly from guide track 122 to barge 32. Further, as seen, intermediate chain member 140 extends horizontally inwardly from guide track 122 to barge 32. The suspension assembly below suspension assembly 46 would be similarly attached to the lower wheel in guide track 122 and the barge 32. The other suspension assemblies would be attached to the guide tracks 124, 126, 128, 130, 132 and 134 and the barge 32.

The suspension assemblies 44, 50, 56 and 58 of FIGS. 1-6 are identical. The suspension assemblies 46, 48, 54 and 56 of FIGS. 1-6 are identical. The only difference between the suspension assemblies 44, 50, 56, 58 and the suspension assemblies 46, 48, 54 and 56 is that the suspension assemblies 46, 48, 54 and 56 are somewhat longer than the suspension assemblies 44, 50, 56 and 58. As stated in the co-pending patent application, the guide tracks or channels could be secured to the barge rather than being secured to the walls of the tank. In that embodiment, the ends of the chains of the suspension assemblies would be secured to the tank.

If an aircraft or a missile should strike either of the cones 100 or 112, the cones will disintegrate and deflect the aircraft or the missile to prevent damage to the nuclear reactor. Additionally, the impact absorbing material in the cones 100 and 112 will lessen the damage to the nuclear reactor. Further, if the barge 32 or the cones 100 and 112 are struck by an aircraft or missile or subjected to an earthquake, the suspension systems will permit the barge 32 to move downwardly in the tank 12 to lessen or absorb the impact forces of the strike.

Figure 7:
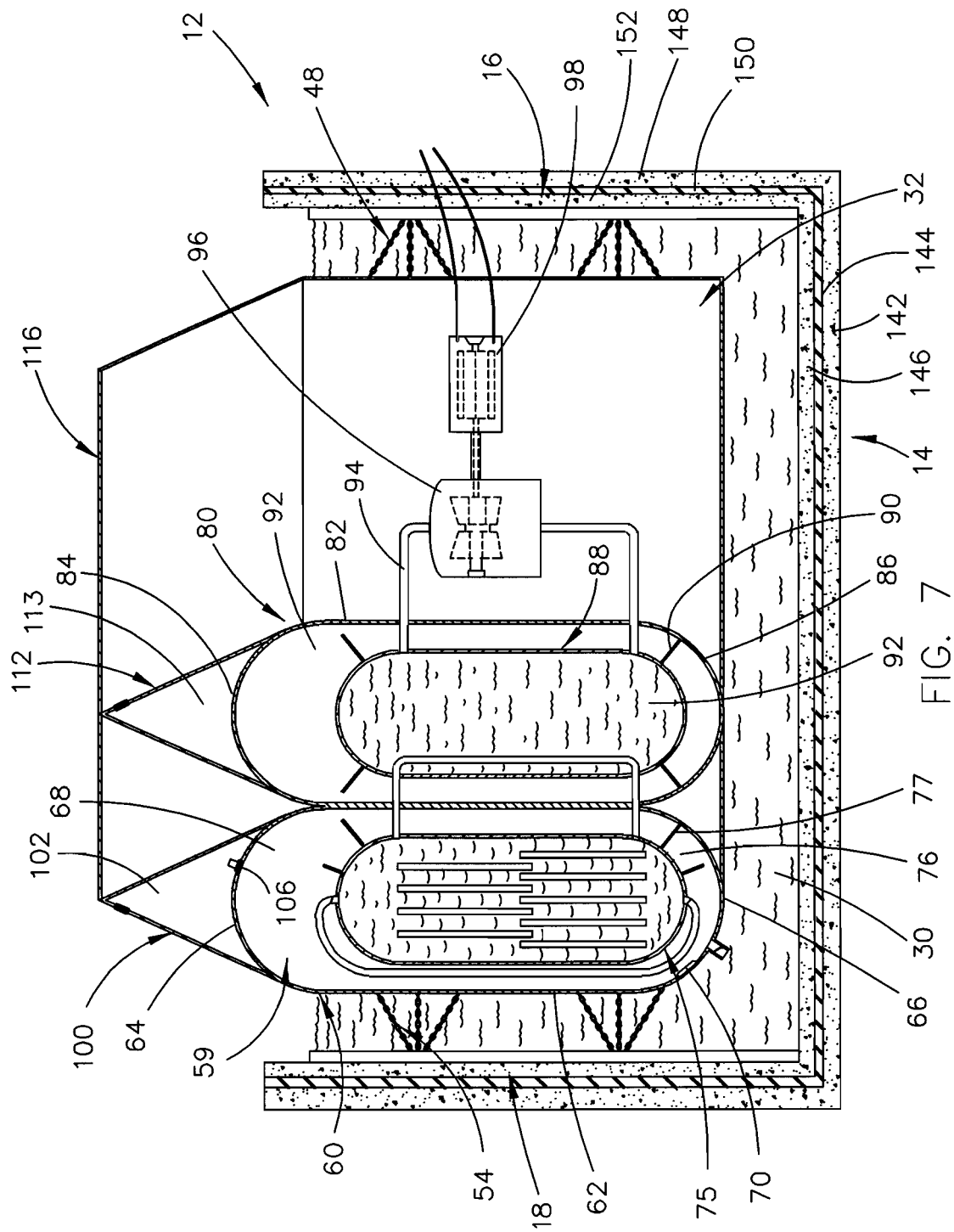
FIG. 7 is a sectional view of the novel tank of this invention and which also illustrates the barge and the nuclear reactor which floats in the tank.
Figure 8:
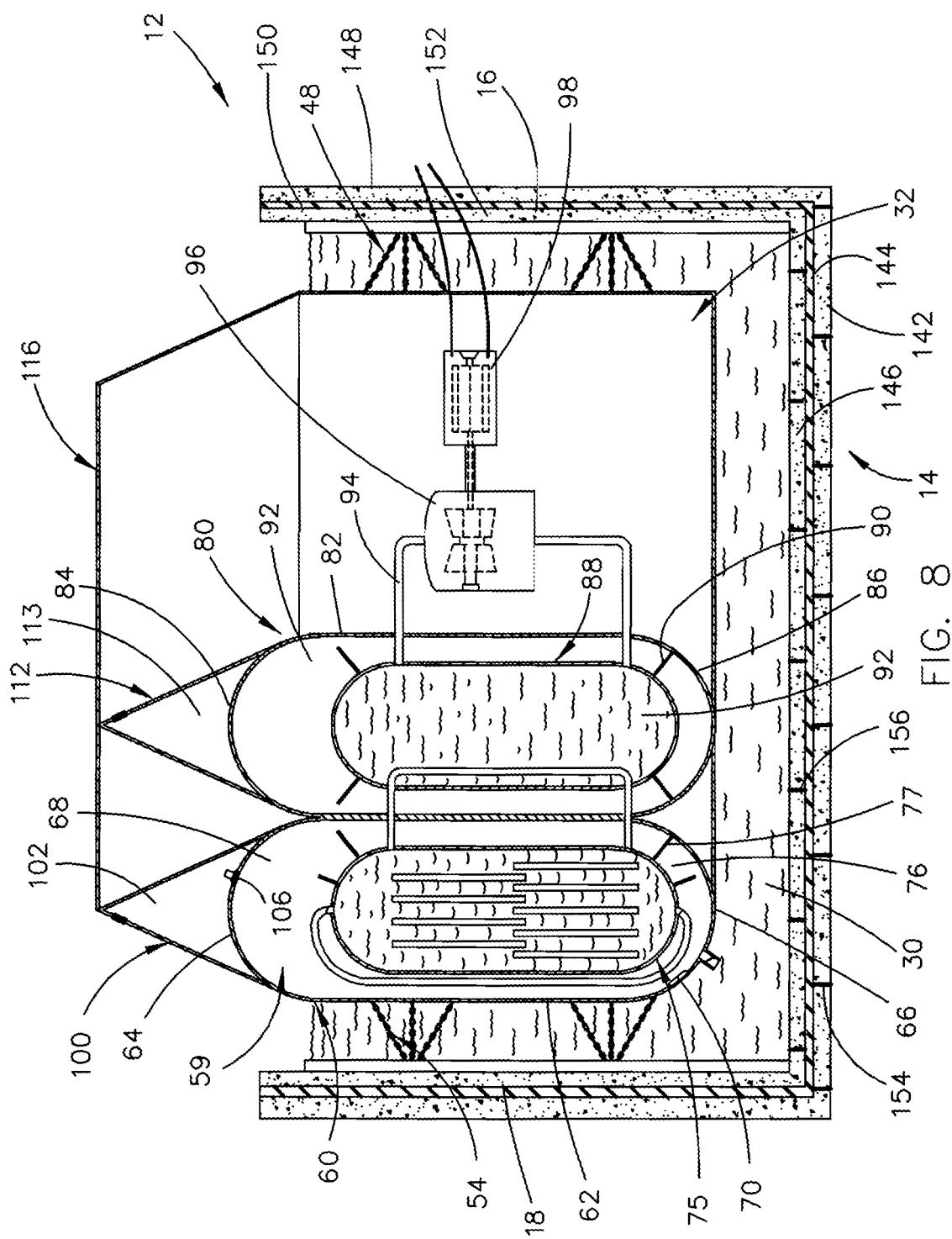
FIG. 8 is a sectional view similar to FIG. 7 except that the concrete layers of the bottom wall of the tank have a plurality of optional joints formed therein.

The instant invention relates to the construction of the bottom wall 14, the first end wall 16, the second end wall 18, the first side wall 20 and the second side wall 22 of tank 12 and which is illustrated in FIGS. 7 and 8. Bottom wall 14 of tank 12 includes a lower concrete layer 142. A flexible water impervious layer of rubber or the like 144 is positioned on the upper side of layer 142. An upper concrete layer 146 is positioned on the upper side of the water impervious layer 144. The lower concrete layer 142, the water impervious layer 144 and the upper concrete layer 146 provides flexibility to the bottom wall 14 to prevent the bottom wall 14 from cracking or fracturing during an earthquake. This prevents contamination of soil in case of a radioactive leak into the water tank.

The end walls 16 and 18 of tank 12 and the side walls 20 and 22 are constructed similarly to the bottom wall or floor 14 of tank 12. Inasmuch as the walls 16, 18, 20 and 22 are identical in construction, only side wall 16 will be described in detail. Side wall 16 includes an outer layer of concrete 148. Side wall 16 also includes an intermediate layer 150 of water impervious material, such as rubber, at the inner side of layer 148. An inner layer 152 of concrete is positioned at the inner side of the water impervious layer 150. The construction of wall 16 prevents leaking of water from the tank 12 at the side of the wall 16 and prevents radioactive contamination of soil in the case of radioactive material leak into the water of the tank.

An optional structure of the system of FIG. 7 is shown in FIG. 8. If necessary, the concrete layer 142 may have water impervious joints 154 formed therein. If necessary, the concrete layer 146 may have water impervious joints 156 formed therein. The joints 154 and 156 are offset from one another.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A floating nuclear reactor, comprising:
   a tank having a bottom wall, an upstanding first end wall, an upstanding second end wall, an upstanding first side wall, an upstanding second side wall;
   said bottom wall having a first end, a second end, a first side and a second side;
   said first end wall having an upper end, a lower end, a first side and a second side;
   said second end wall having an upper end, a lower end, a first side and a second side;
   said first side wall having an upper end, a lower end, a first side and a second side;
   said second side wall having an upper end, a lower end, a first side and a second side;
   said first end wall extending upwardly from said first end of said bottom wall;
   said second end wall extending upwardly from said second end of said bottom wall;
   said first side wall extending upwardly from said first side of said bottom wall;
   said second side wall extending upwardly from said second side of said bottom wall;
   said bottom wall including:
   (a) a lower layer of concrete having a lower side and an upper side;
   (b) a single layer of water impervious and flexible material, having an upper side and a lower side, positioned on said upper side of said lower layer of concrete;
   (c) an upper layer of concrete, having a lower side and an upper side, positioned on said upper side of said single layer of water impervious and flexible material and
   (d) said lower layer of concrete, said single layer of water impervious and flexible material and said upper layer of concrete extending between said first and second end walls and extending between said first and second side walls.

2. The floating nuclear reactor of claim 1 wherein said single layer of water impervious and flexible material is comprised of rubber.

3. The floating nuclear reactor of claim 1 wherein said single layer of water impervious and flexible material is comprised of a synthetic material.

4. The floating nuclear reactor of claim 3 wherein the synthetic material is polyurethane.

5. The floating nuclear reactor of claim 1 wherein said lower layer of concrete has a plurality of spaced-apart joints formed therein with said joints being filled with a water impervious material.

6. The floating nuclear reactor of claim 1 wherein said upper layer of concrete has a plurality of spaced-apart joints formed therein with said joints being filled with a water impervious material.

7. The floating nuclear reactor of claim 5 wherein said upper layer of concrete has a plurality of spaced-apart joints formed therein with said joints being filled with a water impervious material.

8. The floating nuclear reactor of claim 7 wherein said joints in said upper layer of concrete are horizontally off-set with respect to said joints in said lower layer of concrete.

9. A floating nuclear reactor, comprising:
- a tank having a bottom wall, an upstanding first end wall, an upstanding second end wall, an upstanding first side wall, an upstanding second side wall;
- said bottom wall having a first end, a second end, a first side and a second side;
- said first end wall having an upper end, a lower end, a first side and a second side;
- said second end wall having an upper end, a lower end, a first side and a second side;
- said first side wall having an upper end, a lower end, a first side and a second side;
- said second side wall having an upper end, a lower end, a first side and a second side;
- said first end wall extending upwardly from said first end of said bottom wall;
- said second end wall extending upwardly from said second end of said bottom wall;
- said first side wall extending upwardly from said first side of said bottom wall;
- said second side wall extending upwardly from said second side of said bottom wall;
- each of said first end wall, said second end wall, said first side wall and said second side wall including:
  - (a) a single outer layer of concrete having an inner side and an outer side;
  - (b) a single layer of water impervious and flexible material, having an outer side and an inner side, positioned at said inner side of said outer layer of concrete; and
  - (c) a single inner layer of concrete, having an inner side and an outer side, positioned at said inner side of said layer of said water impervious material.

10. The floating nuclear reactor of claim 9 wherein said layer of water impervious material is comprised of rubber.

11. The floating nuclear reactor of claim 9 wherein said layer of impervious material is comprised of a synthetic material.

12. The floating nuclear reactor of claim 11 wherein the synthetic material is polyurethane.

13. A floating nuclear reactor, comprising:
- a tank having a bottom wall, an upstanding first end wall, an upstanding second end wall, an upstanding first side wall, an upstanding second side wall;
- said bottom wall having a first end, a second end, a first side and a second side;
- said first end wall having an upper end, a lower end, a first side and a second side;
- said second end wall having an upper end, a lower end, a first side and a second side;
- said first side wall having an upper end, a lower end, a first side and a second side;
- said second side wall having an upper end, a lower end, a first side and a second side;
- said first end wall extending upwardly from said first end of said bottom wall;
- said second end wall extending upwardly from said second end of said bottom wall;
- said first side wall extending upwardly from said first side of said bottom wall;
- said second side wall extending upwardly from said second side of said bottom wall;
- said bottom wall including:
  - (a) a single lower layer of concrete having a lower side and an upper side;
  - (b) a single layer of water impervious material, having an upper side and a lower side, positioned on said upper side of said lower layer of concrete;
- a single upper layer of concrete, having a lower side and an upper side, positioned on said upper side of said layer of water impervious material;
- each of said first end wall, said second end wall, said first side wall and said second side wall including:
  - (a) a single outer layer of concrete having an inner side and an outer side;
  - (b) a single layer of water impervious and flexible material, having an outer side and an inner side, positioned at said inner side of said outer layer of concrete; and
  - (c) a single inner layer of concrete, having an inner side and an outer side, positioned at said inner side of said single layer of said water impervious and flexible material.

* * * * *